Sept. 2, 1969  R. W. SHAW  3,464,733
CONTAINER FOR TRANSPORTING ARTICLES AND FOR
SELECTIVE RELEASE OF SAME
Filed Sept. 25, 1967  2 Sheets-Sheet 1
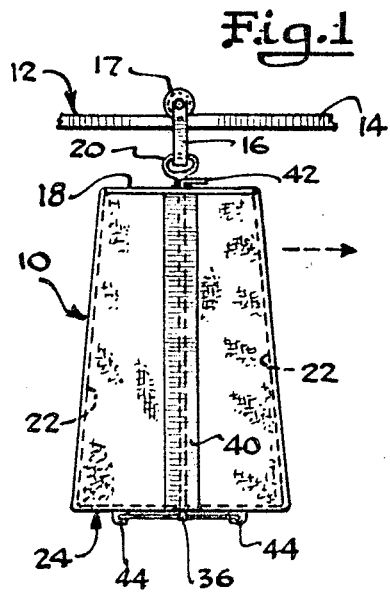
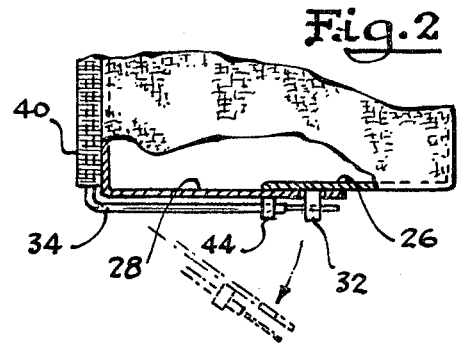
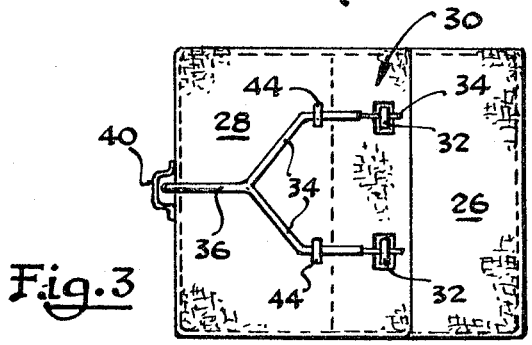
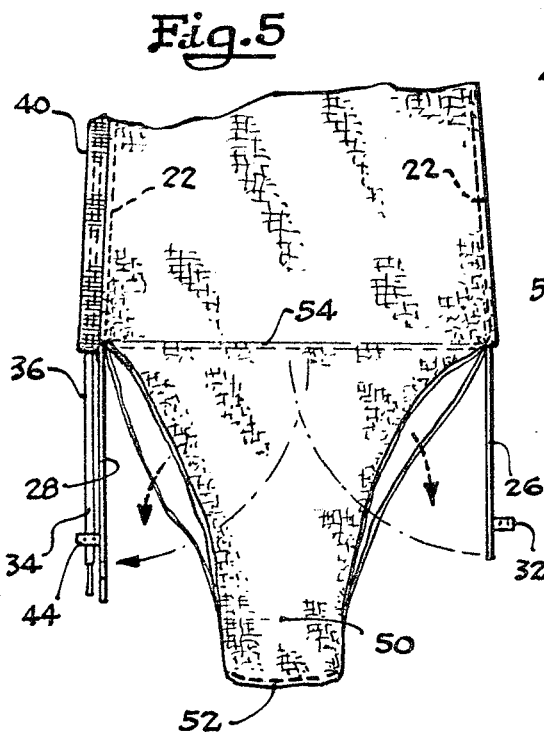
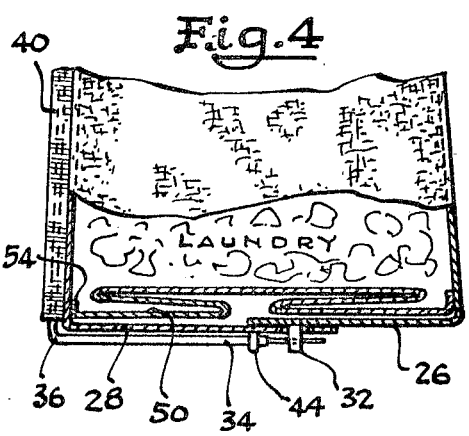
Inventor
ROBERT W. SHAW
By Burmeister & Kulie
Attorneys Sept. 2, 1969   R. W. SHAW   3,464,733
CONTAINER FOR TRANSPORTING ARTICLES AND FOR
SELECTIVE RELEASE OF SAME
Filed Sept. 25, 1967   2 Sheets-Sheet 2
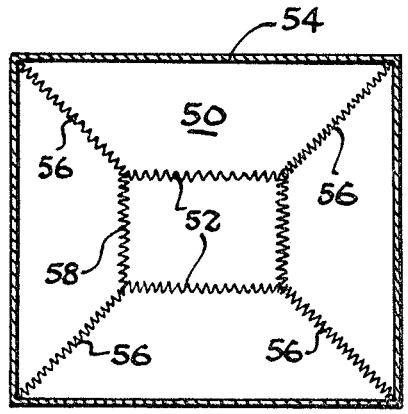
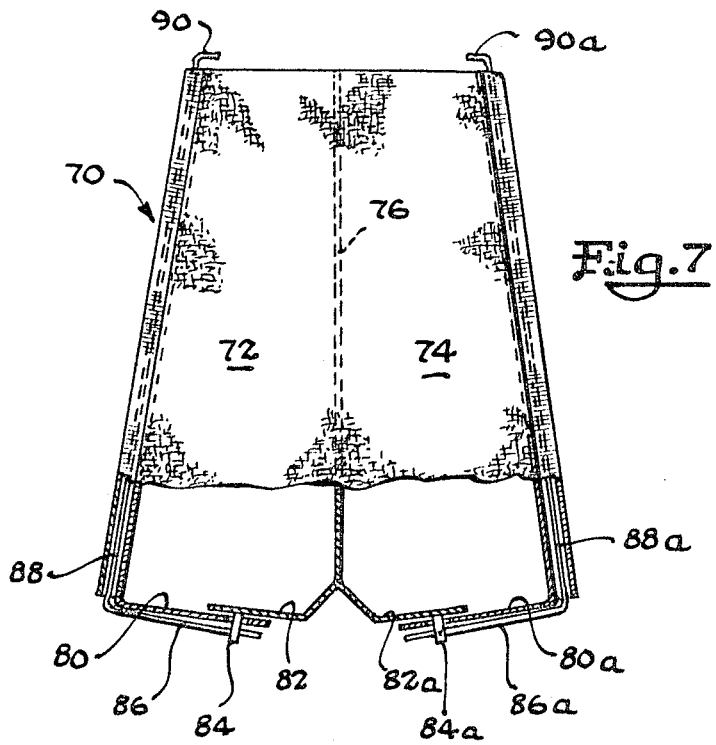
Inventor
ROBERT W. SHAW
By Burmeister & Kulie
Attorneys

United States Patent Office 3,464,733
Patented Sept. 2, 1969

3,464,733
CONTAINER FOR TRANSPORTING ARTICLES AND
FOR SELECTIVE RELEASE OF SAME
Robert W. Shaw, Chicago, Ill., assignor to Tingue, Brown
& Company, Chicago, Ill., a corporation of Delaware
Filed Sept. 25, 1967, Ser. No. 670,216
Int. Cl. B65d 33/30, 33/36
U.S. Cl. 294—71     9 Claims

ABSTRACT OF THE DISCLOSURE

A container for transporting small articles, having a selectively openable bottom closure member with a telescoping chute which, when opened, extends to permit the articles to discharge from the container, the chute adapted to automatically retract after discharge of the articles.

BACKGROUND OF INVENTION

The present invention is particularly adapted for use in transporting soiled laundry, or the like. Many devices and systems have been provided in the past for use in this type of service. However, most devices have been of the rigid frame and rigid wall type.

The rigid frame and rigid wall container has been found to be generally unsatisfactory for use in laundries, or the like. The reason for this is that the containers must move in close proximity to the washers, dryers and other processing apparatus. In order for the articles to be discharged within the laundering devices without spillage onto the floor, the containers must be operated in this manner. Accordingly, it is advantageous to have flexible wall containers for such uses. Moreover, difficulty has been encountered in the handling of rigid wall containers. Flexible wall containers are more useful for storing soiled laundry articles to be cleaned and for handling articles. A rigid wall container is difficult to carry and move and for this reason, among others, other types of containers have been devised.

Another difficulty encountered with containers resides in the need for careful positioning of the container over the processing equipment and close to the charging opening thereof to avoid spillage of articles when they are dumped from the container into the processing equipment. It can readily be seen that if the container is positioned a significant distance above the charging opening of the processing equipment the light garments or articles might disperse from the container discharge opening in a scattered pattern which will carry some of them away from the equipment. This requires manual attendants present at all machines to orient the container and to pick up any articles that may drop onto the floor.

SUMMARY

In accordance with the present invention a flexible wall container is provided for use with a conveyor transport, said container having a releasable bottom opening and release means associated therewith to selectively open the bottom of the container when desired. The container also is provided with an extensible chute which, when the bottom of the container is closed, is disposed wholly within the container and which extends outwardly with respect to the bottom when the container is opened, said chute being automatically retractable when the articles are discharged from the container.

It is, accordingly, a general object of the present invention to provide an improved container for transporting articles and for selective release of these articles from the container.

An additional object resides in the provision of an improved container having a selectively releasable bottom opening.

A further object of the present invention resides in the provision of an improved container for use with conveyor transport means said container being pendulously supported therefrom and having a releasable bottom opening and an extensible chute associated therewith.

An additional object of the present invention resides in the provision of an improved container for use in transporting articles and selectively releasing same having an extensible chute associated therewith which extends from the container upon opening of the container to guide articles to the unloading area and which automatically retracts into the container upon discharge of the articles to provide clearance for continued movement of the container.

Another object of the present invention resides in the provision of an improved releasable bottom opening container for use with conveyor transport means and pendulously supported thereon which includes release means associated with the releasable bottom opening with the release means being operable from the top of the container.

An additional object of the present invention resides in the provision of an improved container for transporting articles and for selective release of same and having an extensible chute associated therewith, said container being economical to manufacture and use; being durable in use; readily adapted for use with any pendulous support means and particularly suited for use with a continuous transport.

The invention itself is set forth with particularlity in the appended claims. Other objects and advantages, however, will be understood from a reading of the description set forth herein in combination with the drawings in which:

FIGURE 1 is a side elevation of the container of the present invention illustrating, in fragmentary form, a portion of the conveyor transport means with which the container may be used;

FIGURE 2 is an enlarged fragmentary view of the bottom closure member of the apparatus in one form of the invention;

FIGURE 3 is a bottom view, enlarged with respect to the view of FIGURE 1, illustrating the release means in further detail;

FIGURE 4 is an enlarged fragmentary view of the bottom portion of the container, like FIGURE 2, showing the releasable bottom opening in closed position with the extensible chute being disposed wholly within the container;

FIGURE 5 is a view like FIGURE 4 except that the releasable bottom opening has been opened and the flaps extend downwardly with the extensible chute moving outwardly with respect to the bottom of the container to permit discharge of materials from the container;

FIGURE 6 is a bottom view of the chute illustrated in FIGURE 5 showing the elastomeric material employed in the seams and around the free end of the extensible chute; and FIGURE 7 is a view of a modified form of the container of FIGURE 1 illustrating a two compartment container each having separate releases means and releasable bottom openings.

Referring particularly now to FIGURE 1 of the drawings, the container of the present invention is illustrated generally at 10. The container is shown being moved along conveyor transport means 12 which transport includes a traverse rail 14 and a carriage 16 having a wheel 17 moveable long the rail surface of the conveyor transport.

A top rigid support member 18 may be provided for support of the container 10. It can readily be appreciated that the support member 18 need be no more than a rectangular or box-like frame having a suitable hook or latch 20 associated therewith to pendulously support the container 10 on the carriage 16 of the conveyor transport 12. It should be noted, of course, that this support member 18 may be secured to the container 10 by securing the upper wall portions of the container about the frame 18, or the member 18 may be releasably secured to the container by snaps or other suitable means.

Corner supports 22 may also be provided for the container 10, if desired, to provide support means for the flexible wall container and to define means for holding the flexible container walls in an open, spaced-apart condition for convenient deposit of articles within the container.

The container may be formed of any suitable fabric, such as canvas, cotton, or the like, which is durable in use and which defines a sufficiently flexible wall characteristic without rapid wear or tendency to tear.

The fabric of the container 10 is supported from the frame 18, as noted above, the drapes over the corner supports 22, as shown in FIGURE 1. The releasable bottom 24 of the container 10 is defined by flap elements 26 and 28 (FIGURES 2–5). The flaps 26 and 28 each are secured at one end, respectively, to opposite walls of the container 10 and extend toward each other. The free ends of the flaps 26 and 28 extend in overlapping relation at about the center of the container. It can readily be appreciated that the flaps may overlap at any portion of the bottom of the container and still be effective in operation as set forth herein.

The flaps 26 and 28 are held in mating, overlapping relation (defining the bottom closed condition) by closure means indicated generally at 30. The closure means includes a first closure latch 32 in the form of eye hooks, for example, secured to one of the flaps 26 and a mating closure latch 34 mounted on the other flap 28—the mating closure latch in the illustrated form of the invention being defined by prongs which move into and out of the eye latches 32 of flap 26. The eye latches move through mating openings in the flap 28 so that when the mating latch 34 extends into the eyes of the latches 32 the flaps will be locked together in closed relation.

As shown in FIGURES 2 and 3 of the drawings, the first closure latch 32 is secured to the flap 26. In the specific embodiment shown a double latch support is provided by first affixing two eye hooks 32 at spaced intervals inboard the free end of the flap 26. These hooks or latches may be secured to the fabric in any manner known in the art, such as by riveting.

In the specific embodiment illustrated in the drawings, the mating closure latch 34 is defined by a Y-shaped element having spaced apart prongs. The prongs of the mating latch 34 are axially movable into and out of the eye of the latches 32.

The Y-shaped latch element 34 is connected to a control rod 36 for the release mechanism. The control rod 36 extends along the bottom of the flap 28 to the wall of the container 10 and then runs upwardly along the wall inside of a protective pocket 40 provided in the wall of the container. The rod 36 then extends to a release latch 42 along the upper portion of the container 10. In this manner the bottom of the container 10 may be selectively opened by drawing the release latch 42 at the upper portion of the container thereby moving the prongs of the latch 34 out of engagement with the eye latches 32 and permitting the flaps 26 and 28 to drop away from each other to open the container.

The Y-shaped latch 34 is slidably disposed within guide members 44 which are secured to the bottom of flap 28. The guide members 44 serve to keep the prongs of the latch 34 in axial alignment with the eye latches 32 of the closure means.

It will be appreciated that the control rod 36 may be in the form of a wire or rod which is slidably disposed in an outer sheathing of material so that the rod 36 will slide only against the outer fixed sheathing and not against the pocket 40 of the container 10. This type of control may be similar to the typical push-pull controls found in automobile control devices. Other forms of control rods also may be employed without departing from the true spirit and scope of this invention.

A telescoping chute 50 is associated with the container 10 to provide controlled discharge of articles from the container and to avoid spillage of the articles during discharge. The chute length should be adequate to permit the free end 52 of the discharge chute 50 to extend within, or very close proximity to, the access opening of processing equipment into which the articles are to be deposited. The opposite end 56 of the chute 50 is secured to the bottom of the container 10, as illustrated in FIGURES 4 and 5 of the drawings.

The chute 50 may be defined by four joined panels, as generally illustrated in schematic form in FIGURE 6 of the drawings. This type of chute will provide a generally square configuration. It should be noted, however, that the chute 50 may be formed in various ways. One other way of forming would involve a continuously woven circular chute; a chute made of one panel joined along one seam; a chute made of two panels joined along their mating edges. Each of the latter forms will provide a chute of circular or frusto-conical configuration, open at both ends. It will be readily appreciated that any type of chute configuration, such as those noted above, will be satisfactory for the container of the present invention.

Notwithstanding the form of chute 50 employed with the container 10, it is necessary to provide elastomeric means within the chute wall to define closure means for the chute and to define means to automatically retract the chute after discharge of the articles from the container 10. As shown in FIGURE 5, a four panel chute 50 may include an elastomeric element 56 within each of the seams of the chute 50. The elements 56 will be disposed within the chute wall such that they are fastened at the end 54 and tend to return to a relaxed condition within the chute 50 retracted substantially wholly within the container 10.

An elastic band 58, or the like, is provided at the free end 52 of the chute 50 to partially close the chute during the storage function of the container. The band 58, of course, is adapted to open upon extension of the chute 50 from the container during discharge of the articles by weight of the articles acting upon the band to dilate the opening to permit passage of articles therethrough.

When the container 10 is used for storage and transporting of articles, the chute 50 will be folded within the container 10 at the bottom thereof substantially as schematically illustrated in FIGURE 4 of the drawings. When the container is positioned over the equipment into which articles are to be deposited, the release catch 42 is moved to pull the prongs of the mating latch 34 out of engagement with the eye latches 32. The weight of the articles within the container 10 will cause the flaps 26 and 28 to drop open, as shown in FIGURE 5. The weight of the articles also will push the chute 50 ahead of them in movement out of the container and toward the equipment in which they are to be deposited.

The chute 50 is extended against the action of the elastomeric material cords 56 within the walls of the chute. The elastomeric material should be such that it will only retract an empty chute and not one within which articles still remain. After all of the articles have been discharged from the container 10, the elastomeric material within the walls of the chute 50 will withdraw the chute 50 and retract it toward the container 10 to provide clearance for movement of the container along the processing line.

A modified form of the apparatus of the present invention is shown in FIGURE 7 of the drawings. In this form of the invention, a two compartment container 70 is illustrated. Each of the compartments 72 and 74 of the container 70 is provided with separate bottom opening means similar to the apparatus discussed in detail hereinabove in connection with FIGURES 1-6, inclusive.

The frame support structure for the modified container of FIGURE 7 may be substantially the same as that described for the container 10 of FIGURES 1-6. However, a center support mmeber 76 may be provided to define support means for the center portion of the container 70. The container 70 is provided with a flexible compartment wall between the chambers 72 and 74 thereof for separate loading and storage of the chambers and to maintain the articles separate in each chamber.

The chamber 72 is provided with bottom flaps 80 and 82 to define a closure therefor. The flap 82 is provided with the eye latches 84 while the flap 80 is provided with the Y-shaped mating latch 86. A control rod 88 extends from the latch 86 upwardly along the wall of the chamber 72 to a release latch 90 disposed at the top of the chamber 72.

The chamber 74 is provided with bottom flaps 80a and 82a to define a closure therefor. The flap 82a is provided with eye latches 84a while the flap 80a is provided with the Y-shaped mating latch 86a. A control rod 88a extends from the latch 86a upwardly along the wall of the chamber 74 to a release latch 90a disposed at the top of the chamber 74.

It can readily be seen that the closure members for the chambers 72 and 74 are operated in the same manner as the closure member for the container 10 discussed in connection with FIGURES 1-6, inclusive.

The chambers 72 and 74 of the container 70 may be provided with extensible chutes (not shown), if desired, in the same manner as that shown in FIGURES 1-6 and discussed hereinabove. The chutes are adapted, as noted above, to extend from the bottom of the chute when the bottom closure members of the chambers are opened and the free end of the chutes will extend within, or very close to, the processing equipment within which the articles are to be placed. Additionally, the chutes are provided with an elastomeric material to partially close the free end thereof and to define automatic withdrawal means for the chutes when the articles have been completely discharged from the chambers.

While a specific embodiment of the present invention is shown and described it should be observed that other modifications and alternative constructions may be used without departing from the true spirit and scope of the invention. It is intended by the appended claims to cover all such modifications and alternative constructions as fall within their true spirit and scope.

What I claim as new and desire to secure by Letters Patent of the United States, is:

1. A container for use with conveyor transport means and adopted for selective discharge of materials comprising:

a flexible wall container adapted to be pendulously carried along on said conveyor transport means, said container having a releasable bottom opening;

release means associated with said container and having a release catch mounted on the container and closure means releasably seecuring the bottom opening of the container, said closure being operatively connected to the release catch; and an extensible chute wholly disposed within the container when the releasable bottom of the container is closed and extending outwardly with respect to the bottom when the bottom of the container is opened, said extensible chute being defined by a closed tunnel-like shape open at both ends wherein one end of said chute is secured to the bottom of the container and wherein the other end is adapted to freely drop from the container when the bottom is open, said other end being encircled by an elastic material to elastomerically close said other end, with said elastomeric closure being delatable to permit articles to freely pass therethrough.

2. The container of claim 1 for use in transporting soiled laundry wherein the wall of the container is of a suitable cotton material.

3. The container of claim 1 which is open at the top and having a canvas wall.

4. The container of claim 1 wherein the release catch is mounted at the top of the container, said container having means to pendulously support the container on the conveyor transport.

5. The container of claim 1 wherein the releasable bottom opening is defined by overlapping flaps.

6. The container of claim 5 wherein the closure means includes a closure latch on at least one of said flaps and a mating closure latch on another of said flaps said closure latch and mating closure latch, in one position, in combination, holding the bottom of the container closed and in a second position being disengaged and permitting the bottom of the container to fall open.

7. The container of claim 6 wherein at least one latch is operatively connected to the release catch of the release means.

8. The container of claim 1 wherein the chute is folded within the container when the bottom is closed and telescopically extends from the bottom of the container when the bottom is opened.

9. The container of claim 1 wherein the extensible chute is provided with means to automatically retract the chute toward the container when there is no weight upon the chute.

References Cited

UNITED STATES PATENTS

| | | | |
|---|---|---|---|
| 931,315 | 8/1909 | Kerr | 294—69 |
| 2,616,758 | 11/1952 | Meyers | 298—30 |
| 2,712,797 | 7/1955 | Woehrle et al. | 298—17 |

ANDRES H. NIELSEN, Primary Examiner